United States Patent [19]

Fujishiro et al.

[11] 4,275,602
[45] Jun. 30, 1981

[54] FLUID FLOW MEASURING APPARATUS

[75] Inventors: Takeshi Fujishiro, Yokosuka; Hiroshige Ozawa, Zushi, both of Japan

[73] Assignee: Nissan Motor Company, Limited, Yokohama, Japan

[21] Appl. No.: 78,691

[22] Filed: Sep. 25, 1979

[30] Foreign Application Priority Data

Sep. 25, 1978 [JP] Japan ................................ 53-117592

[51] Int. Cl.³ .............................................. G01F 1/32
[52] U.S. Cl. ............................................... 73/861.22
[58] Field of Search .......... 73/194 VS, 861.22, 861.24

[56] References Cited

U.S. PATENT DOCUMENTS 3,979,954 9/1976 Ide et al. ................................. 73/194
4,186,599 2/1980 Frick ...................................... 73/194

Primary Examiner—Herbert Goldstein
Attorney, Agent, or Firm—Schwartz, Jeffery, Schwaab, Mack, Blumenthal & Koch

[57] ABSTRACT

A Karman vortex type flow rate measuring apparatus is provided with a plurality of vortex shedding members each having a different effective width, and a plurality of vortex detecting elements. The distance between the vortex detecting elements is so selected that it coincides with the distance between the vortices of some one of the vortex trains induced by respective vortex shedding members. The apparatus enables a positive and accurate detection of the vortices, and a compensation for drop out of the vortex shedding.

8 Claims, 2 Drawing Figures

FLUID FLOW MEASURING APPARATUS

The present invention relates to an apparatus for measuring fluid flow by detecting Karman vortices.

By disposing a columnar obstruction within a conduit transversely to the flow direction, Karman vortices are induced by, and shed from opposite sides of the obstruction alternately. The frequency of the vortex shedding is proportional to the flow velocity. Accordingly, by detecting Karman vortices directly or indirectly, flow rate of the fluid can be measured. Flow measuring apparatus based on this principle, per se, is known as Karman vortex type flow measuring apparatus.

BRIEF DESCRIPTION OF THE DRAWINGS

FIG. 1 shows a conventional arrangement of such a flow measuring apparatus. There is disposed, within a conduit 1, a columnar vortex shedding member 2 extending substantially at right angle with respect to the flow direction or stream line of fluid flowing through the conduit 1. By this arrangement, the fluid caused to separate alternately from opposite sides of the vortex shedding member 2 in proportion to the flow velocity of the fluid, and a regular vortex train is formed downstream of the vortex shedding member. In this vortex train, the vortices are spaced from each other by a predetermined distance l.

Figure 1:
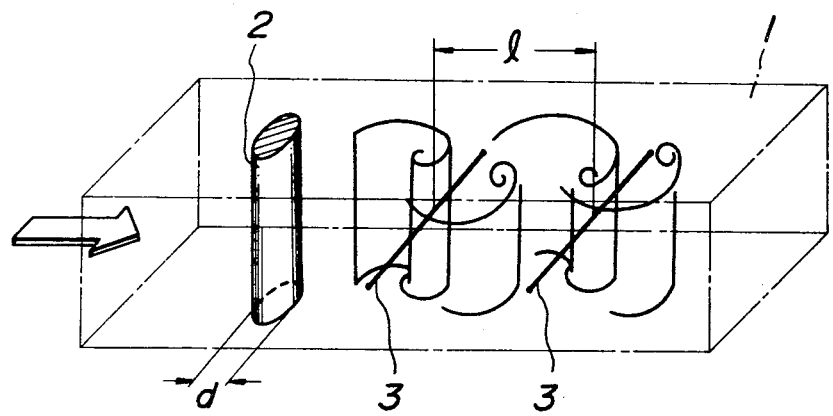
FIG. 1 is a view of a conventional vortex shedding flowmeter.

This distance l is determined only according to the diameter d of the vortex shedding member 2, and is normally expressed as follows:

$$l = a \cdot d$$

wherein $a$ represents a coefficient which varies slightly according to the Reynold's numbers. This shows that the distance l is independent of the flow velocity.

Based on this principle, proposals have heretofore been made to dispose detecting elements 3 on the downstream of the vortex shedding member 2 with the distance l therebetween, which is determined by the outer diameter of the vortex shedding member 2. The detecting elements 3 may consist of hot wires supplied with a constant current, whose resistance varies due to variation of the temperature thereof. In this case, since the local velocity of the fluid at each vortex is increased, the hot wires 3 will be cooled by the vortex resulting in an increase in the resistance. Accordingly, the output voltage of the hot wires 3 varies in accordance with the frequency of the vortex shedding. Thus, the flow velocity can be determined from the frequency of variation in the output voltage and then, the flow rate can be determined according to the cross-sectional area of the conduit 1.

This known arrangement encounters the following problems. Firstly, where the flow velocity of the fluid of which the flow rate is to be measured varies remarkably, accompanying variation in the Reynold's numbers, the distance l between the vortices tends to slightly fluctuate according to the variation in the flow velocity. As the result, since the distance between the vortex shedding member 2 and the hot wires 3 is fixed, cooling effect of the wires will not be uniform due to the variation in the distance between the vortices so that the amplitude of the output voltage of the wires will be decreased. Hence an accurate measurement in a highly reliable manner cannot be expected.

Secondly, as the flow of the fluid becomes turbulent, the Karman vortices tend to be dropped out and will not be generated regularly. This is particularly the case where there is provided a single member for generating the vortices and a single member for detecting the vortex shedding. In such a case, drop out of the vortices directly results in drop out of the output voltage or the output signal which generates undesirable measuring errors.

The present invention is to obviate the problems of the known arrangement referred to in the foregoings, and has for its object to provide an improvement which is capable of compensating for the variation in the flow velocity, and for the drop out of the vortex shedding.

In order to achieve the object, the flow measuring apparatus according to the invention comprises a plurality of vortex shedding members and a plurality of vortex detecting elements. By providing a plurality of vortex shedding members each having a different effective diameter, the distance between the Karman vortices has a certain distribution. Accordingly, even when the distance between the vortices varies according to the fluctuation of the Reynold's numbers, the distance between the vortices of some one of the vortex trains agrees with the distance between the detecting elements. By this measure, frequency of the vortex shedding can be measured in a positive and accurate manner.

Figure 2:
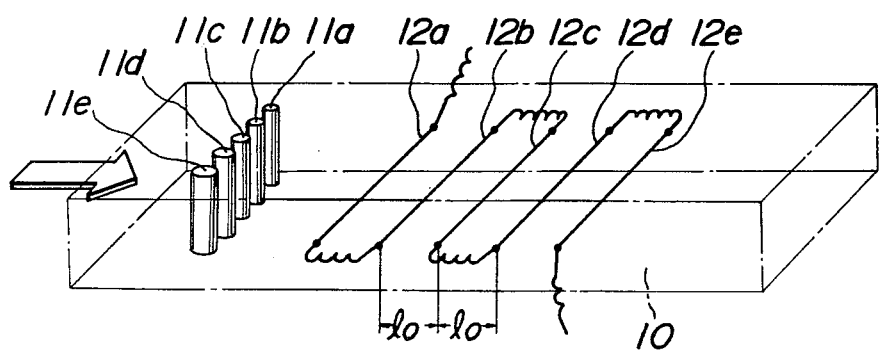
FIG. 2 is a view of the present invention showing a plurality of vortex shedders.

The present invention will now be described with reference to FIG. 2 which shows a preferred embodiment thereof.

In this figure, reference numeral 10 designates a conduit having a predetermined effective cross-sectional area through which flows the fluid whose flow rate is to be measured. Within the conduit 10, there is disposed a plurality of columnar vortex shedding members 11a–11e, five in number, for example. The vortex shedding members 11a–11e are arranged at right angle with respect to the stream line of the fluid and are parallel with each other. The vortex shedding members 11a–11e are spaced from each other by a predetermined distance, and form a row extending transversely of the conduit 10.

Each of the vortex shedding members 11a–11e is of cylindrical shape and has a different effective diameter $d_1$–$d_5$, respectively.

It will be apparent from the foregoing that each different diameter results in a given distance between vortices which is different from that resulting from other diameters of shedding members.

Vortex detecting means comprises a plurality of hot wires 12a–12e disposed downstream of the row of the vortex shedding members 11a–11e, which wires are spaced from each other a predetermined distance $l_o$ which preferably is constant. This distance $l_o$ is determined so that it lies within a range between the maximum and the minimum distance between the vortices shed by the respective members 11a–11e. In other words, the distance $l_o$ between the hot wires 12a–12e coincides or substantially coincides with the distance between vortices formed by some one of the members 11a–11e for the Reynold's numbers within the range of the measurement.

The hot wires 12a–12e are connected in series with each other, and form a spatial filter generating an output signal in which presence of particular vortices whose distance is $l_o$ are emphasized. The hot wires may alternatively be connected in parallel with each other.

By thus providing a plurality of vortex shedding members $11a$–$11e$ each having a different effective diameter, each of the members $11a$–$11e$ induces Karman vortices of which the distance $l_1$–$l_5$ between the vortices differs from each other.

Since the distance between the hot wires $12a$–$12e$ is tuned with the basic or mean distance between the vortices, vortices of the vortex trains shed by respective members $11a$–$11e$ are located in the neighbourhood of the hot wires $12a$–$12e$. Due to an increase in the flow velocity caused by the vortices of one of the vortex trains of which the distance between the vortices at least substantially coincides with the distance $l_o$ between the hot wires, those hot wires are cooled in accordance with the frequency of the vortex shedding in this train.

Accordingly, even when the flow velocity and hence the Reynold's numbers varies resulting in a fluctuation of the distance between the vortices, one of the vortex shedding members $11a$–$11e$ necessarily generates a vortex train of which each vortex is spaced from each other a distance which coincides or substantially coincides with the distance $l_o$ between the hot wires $12a$–$12e$, so that a positive detection or counting of the vortices can be effected.

Since the vortex detecting means comprises a plurality of equidistantly spaced hot wires $12a$–$12e$, output signal can be obtained by which the presence of vortices spaced from each other the distance $l_o$ is emphasized, and the level of the signal is prevented from descending.

As the frequency of the vortex shedding is accurately proportional to the flow velocity, accurate flow velocity can be determined by detecting the frequency of the vortex shedding even when the distance between the vortices fluctuates.

Provision of a plurality of vortex shedding members $11a$–$11e$ makes it possible to compensate for the drop out in some of the vortex trains of the vortex shedding caused due to the turbulence of the fluid flow; this compensation being effected by vortices of the other of the vortex trains which are free from such a drop-out. In other words, even when the distance between vortices of the train subjected to undesirable drop out coincides with the distance $l_o$ between the hot wires, vortices of the other of the trains serve to cool, to some extent, the hot wires. Thus, a practically useful output signal can always be obtained.

Although in the embodiment thus far described, the vortex shedding members $11a$–$11e$ are shown as being of cylindrical shape, those members may be bars or rods of triangular or square cross-section.

Of course, the same considerations as to producing different distances between vortices apply to the non-cylindrical configurations. That is, the non-cylindrical shedding members will each have different effective sizes to produce different distances between vortices. It will be apparent that by "effective size" is meant the size required to produce a given distance between vortices produced by any one vortex shedding member. Alternatively, the vortex shedding members may consist of a grid or a mesh formed by a plurality of metallic wires each having a different effective size. This mesh may be planer or crumpled into a wad. Furthermore, the vortex detecting means may consist of pressure sensors.

As is apparent from the foregoing description, the apparatus according to the present invention enables positive detection of the Karman vortices in accurate proportion to the flow velocity even when the latter fluctuates remarkably, and is capable of compensating for the drop out of the vortex shedding so that a remarkably improved reliability in measuring the flow rate can be obtained.

What is claimed is:

1. An apparatus for measuring flow rate of a fluid by detecting Karman vortices and comprising a conduit through which the fluid is permitted to flow, vortex shedding means disposed within the conduit and extending across the flow direction of the fluid, and at least two vortex detecting means disposed downstream of the vortex shedding means and spaced from each other by an amount corresponding to the distance between the vortices, the vortex shedding means comprising a plurality of vortex shedding members each having a different effective size, said effective size of any one vortex shedding member being the size required to produce a given distance between vortices generated by that one vortex shedding member, each distance between the vortex detecting means being selected to be within the range between the maximum and the minimum distance between the vortices shed by said members.

2. An apparatus as claimed in claim 1, wherein the vortex shedding members consist of parallel bars forming a row extending transversely to the flow direction of the fluid.

3. An apparatus as claimed in claim 1, wherein the vortex shedding members are connected to each other such that they form a grid or mesh.

4. An apparatus as claimed in claim 1, wherein each of the vortex detecting means consists of a hot wire fed with constant current.

5. An apparatus as claimed in claim 2, wherein each of the vortex detecting means consists of a hot wire fed with constant current, the hot wires extending in parallel with the row of the vortex-shedding bars.

6. An apparatus as claimed in claim 4 or 5, wherein the hot wires are connected in series with each other.

7. An apparatus as claimed in claim 4 or 5, wherein the hot wires are connected in parallel with each other.

8. An apparatus as claimed in claim 1, wherein said vortex shedding members have the form of parallel cylindrical bars forming a row extending transversely to the flow direction of the fluid, said cylindrical bars having diameters, the diameters of said cylindrical bars each being different from each other.

* * * * *